United States Patent [19]

Ragle

[11] 4,314,290
[45] Feb. 2, 1982

[54] DI-BIT RECORDING TECHNIQUE AND ASSOCIATED SERVO INDICIA

[75] Inventor: Herbert U. Ragle, Thousand Oaks, Calif.

[73] Assignee: Burroughs Corporation, Detroit, Mich.

[21] Appl. No.: 139,919

[22] Filed: Apr. 14, 1980

Related U.S. Application Data

[63] Continuation of Ser. No. 970,441, Dec. 18, 1978, abandoned, which is a continuation of Ser. No. 807,155, Jun. 16, 1977, Pat. No. 4,166,282.

[51] Int. Cl.³ .................... G11B 5/56; G11B 21/10
[52] U.S. Cl. ................................ 360/77; 360/21
[58] Field of Search .................. 360/76–78, 360/71, 21, 106, 109, 135

[56] References Cited

U.S. PATENT DOCUMENTS

| | | | |
|---|---|---|---|
| 2,929,670 | 3/1960 | Garrity | 360/21 X |
| 2,938,962 | 5/1960 | Konins et al. | 360/77 |
| 3,185,972 | 5/1965 | Sippel | 360/76 X |
| 3,665,118 | 5/1972 | Cooper, Jr. | 360/21 |
| 3,678,220 | 7/1972 | Luhrs | 360/71 |
| 3,686,649 | 8/1972 | Behr | 360/77 |
| 4,007,493 | 2/1977 | Behr et al. | 360/77 |
| 4,074,328 | 2/1978 | Hardwick | 360/76 X |
| 4,166,282 | 8/1979 | Ragle et al. | 360/77 |

FOREIGN PATENT DOCUMENTS

| | | | |
|---|---|---|---|
| 174220 | 3/1953 | Austria | 360/21 |
| 2713194 | 10/1978 | Fed. Rep. of Germany | 360/77 |

OTHER PUBLICATIONS

IBM/TDB vol. 4, No. 5, Oct. 1961, pp. 24-25, "Transducer Position Sensor" by Tsilibes.
IBM/TDB vol. 5, No 1, Jun. 1962 p. 33, "Magnetic Head Positioning" by Buslik.
IBM/TDB vol. 17, No. 4, Sep. 1974, p. 1168, "Phase Sensing Magnetic Recording Head" by Jansen.

*Primary Examiner*—John H. Wolff
*Attorney, Agent, or Firm*—John J. McCormack; Nathan Cass; Kevin R. Peterson

[57] ABSTRACT

Disclosed are techniques for recording digital data marks in a "herringbone" pattern along co-aligned data tracks—preferably with a di-gap transducer—wherein head registration is guided by "LAMBDA" ("V-shaped" or "A shaped") servo marks impressed along data tracks and readily detected (e.g., by a di-gap transducer).

9 Claims, 13 Drawing Figures

DI-BIT RECORDING TECHNIQUE AND ASSOCIATED SERVO INDICIA

CROSS-REFERENCE TO RELATED APPLICATIONS

This is a Continuation of Application Ser. No. 970,441, filed by Herbert U. Ragle and Norman S. Blessum on Dec. 18, 1978, now abandoned; which is a Continuation of Ser. No. 807,155, filed by Herbert U. Ragle and Norman S. Blessum on June 16, 1977, issuing on Aug. 28, 1979 as U.S. Pat. No. 4,166,282.

These commonly-assigned patent applications are related to the subject matter of this application and are herewith incorporated by reference.

BACKGROUND OF THE INVENTION

The subject invention relates to magnetic recording techniques and particularly to such as implemented to accommodate improved head positioning means and servo indicia.

Workers in the magnetic recording arts are aware that there is a need for improved techniques and associated apparatus for properly registering transducer means relative to any selected data track on a magnetic record. Efforts have continued for sometime now to fill this need; especially for high density recording.

On such recording system involves a magnetic disk array typically used as peripheral memory equipment in a computer system to provide (temporary or permanent) information storage during computer operations. In one well-known configuration, the data bits are impressed along disk tracks in a "herringbone" pattern as known in the art and illustrated in FIGS. 1A and 3 hereof.

Workers will recognize that optimal use of such media requires that information be recorded at the highest possible density; thus workers often strive to maximize tpi, the number of circumferential tracks per inch across a disk with each track made as narrow as possible. Accordingly, with ever higher bit densities and track densities, it is apparent that head-positioning systems are being pushed to their limit. Systems for quickly and accurately registering heads with a selected data track are becoming more and more sophisticated, and more complex and expensive, and their operating parameters more stringent. The invention responds to this need, teaching a novel technique whereby "track-on-data" is feasible.

Workers will recognize that for the typical magnetic disk system a recording head is translated radially across the disk so that the magnetic transducer gaps mounted therein may be selectively positioned adjacent a selected recording track. In this way only a few transducer gaps need be used for recording and reading data on a number of disk tracks—but to practically implement such a system, a very careful, accurate control of head location relative to the tracks must be kept—and this typically must be done very quickly to minimize access time for the computer system served.

For instance, with disks used in a random access magnetic memory the data bits are recorded in concentric circular tracks so there is a continual need to secure and maintain very accurate registry of a magnetic transducer with a selected track. Unfortunately, the precision of the transducer-positioning system will determine track spacing tolerances and accordingly will influence data storage efficiency (bit compression) significantly—that is the number of characters per unit memory area will depend upon the accuracy of transducer positioning. Workers have attempted in various ways to improve the accuracy of transducer positioning, for "selvoing" the transducer onto disk tracks. Such systems have commonly employed "position signal" tracks (or track sectors) interspersed with the data tracks and have also required a special servo transducer detector to detect the "position-signals". They also add the operation of writing the servo data. Such features inherently degrade data storage efficiency—because of the separate servo transducer system required (e.g., buildup of mechanical tolerances in the different transducers used; because of the considerable loss of useful data recording area to recording position-bits, and so forth).

As workers known (also see U.S. Pat. No. 3,691,543; 3,812,533; and 3,838,457) "fine" positioning is typically achieved by controlling the movement of a head positioning carriage in response to the detection of pre-recorded encoded servo data, using either the data transducer or a special servo transducer. The servo data is either recorded on the same disk as the work data or else on a separate disk, or on a like surface having a precise mechanical relationship with the work data surface.

"Coarse" positioning is typically achieved in either of two ways: (1) by controlling radial head movement based on detection of the movement of the head positioning carriage, such as by photo-electric detection means (e.g., see U.S. Pat. No. 3,812,533), or (2) by controlling radial head movement based on detected track crossings, while using recorded servo data for fine positioning purposes (e.g., see U.S. Pat. Nos. 3,691,543 and 3,838,457).

Workers are also aware of various positioning techniques (using mechanical, hydraulic and/or electromagnetic means) for registering magnetic transducers with associated recording tracks. Certain noteworthy mechanical or optical techniques are known for monitoring transducer position relative to a track and providing feedback signals which may be used to control a servo positioning-control system adapted to keep the transducer gap(s) registered with the track. However, none of the present known techniques for monitoring and controlling head position is wholly satisfactory—partly because of the extensive complex, auxiliary equipment they require and/or because of the limitation these approaches place on track density. An object of this invention is to provide an answer to this problem by teaching improved "track-on-data" techniques and associated systems.

Workers in these arts will recognize that it is quite desireable to "track-on-data", that is to somehow use the area devoted to "data-bits" (i.e., "information signals" developed from certain magnetic transitions) to also provide position control signals which may be fed to a positioning servo and control the positioning and/or alignment of a transducer relative to a recorded track. Obviously, such a technique can eliminate the need for a separate "servo" recording unit and related separate recording zones for servo data (such as separate servo disks or separate servo tracks, or track-sectors, typically seen in conventional magnetic recording systems) since the data-transducer and the data-recording zones may be used for servo-bits too. The invention accomplishes this, providing a "track-on-data" system with no need for separate servo tracks and providing "LAMBDA" configured servo indicia (e.g., see V,A marks of FIGS. 1A, 3, etc.,) which may readily be incorporated into the data recording zones as desired.

Workers will recognize the significant advantages from such a "track-on-data" technique. For instance, present day magnetic disk memory systems typically allocate servo bits to special "servo tracks" (either on a special portion of each disk or on a special disk in each file) dedicated to this purpose. Workers will also acknowledge that present day systems commonly detect transducer positioning (servo, signals according to amplitude-modulation techniques (i.e., by variations in the amplitude of position-indicating recorded magnetic transitions, cr "servo-bits"), and that this is less than optimal. For instance, the amplitude-sensitive transducers typically required are all too subject to "noise". Since erroneous amplitude variations can result from many common sources, such "noise" makes the servo systems based on this approach subject to serious error. An example of this approach is found in U.S. Pat. No. 3,864,740 to Sordello et al. and in U.S. Pat. No. 3,185,972 to Sippel and in U.S. Pat. No. 3,614,756 to McIntoch, et al.

The Sordello patent in particular will indicate the lengths to which workers have gone to try to compensate for the difficulties arising from amplitude sensing. That is, Sordello will be seen to represent a "track following" method of detecting transducer position wherein prerecorded tracks are positioned on a recording medium so as to facilitate the direct detection of transducer position relative to the medium. A related U.S. Pat. No. 3,404,392 to Sordello discloses a track-following servo system. In this system a special pair of servo tracks is laid down on either side of each data track, the servo-bits in one of these servo tracks being recorded at one signal frequency and those of the other at a second frequency, the corresponding servo-output signals being frequency-separated by electronic filtering means which generated a summed servo signal. With such a system it is imperative that the frequencies of the two servo tracks differ sufficient to permit effective filtering and signal separation since the associated detecting transducer was "reading" both tracks simultaneously.

Conversely the first-named Sordello U.S. Pat. No. (3,864,740) postulates a pair of adjacent servo tracks wherein equal-amplitude servo signals are impressed, the servo tracks being prerecorded on the medium with a relatively inconsequential frequency difference; then, upon detection, the resultant servo signals are frequency-multiplied. That is, a pair of servo signal detection means are provided to modulate (multiply) the transducer output with modulating signals at the frequency of the first and second servo track waveforms and thereby generate a summed servo-output. This output represented the frequency difference between the original servo signal and respective modulating signal. By detecting the magnitude of this output (difference) signal, servo signals are generated for regulating servo positioning means.

Such a system will servo the transducer into registry with a selected data track. Workers will realize that the servo tracks flanking each data track represent a single continuous linear recording at two different encoded frequencies. Thus, if a single transducer is arranged to simultaneously read a data track and the flanking servo tracks—all together—and if means are provided to filter the servo information from the data signals, and then compare the two servo signals: then, one may develop a "position-error" signal and apply it to an actuator-servo unit to reposition the transducer.

However, such a system has the inherent disadvantage that the data and servo-bits must be separately recorded and at widely-spaced frequencies. Also, the servo frequencies cannot be harmonic of one another lest there be any harmful interaction between the (data and the servo) outputs. Another serious disadvantage, is that such a magnetic transducer will have a different transfer function for the data bits (frequency) then it has for the servo-bits (frequencies); and this can introduce further error.

Similarly, in the cited McIntoch patent a transducer positioning system is taught which comprises a magnetic disk with servo tracks and data tracks, with the magnetic domains of the servo tracks oriented relatively orthogonal to those of the data tracks. A transducer is provided to generate two outputs—a "data output" representing the rate of intensity change of the magnetic data domain and a "servo output" representing a function of the absolute magnitude of magnetic field represented by the magnetic servo domains. A flux-sensing portion of the transducer detected this servo output and thus indicated the transducer position relative to the data track, presenting an "error signal" to a servo positioning means.

One feature of such a servo system is that it provides a head repositioning-(or servo-error-) signal which is independent of medium movement relative to the transducer—that is, the acceleration or deceleration of the medium will not effect transducer response—evidently because the flux-sensing means will provide the prescribed output independent of whether the medium is moving at different speeds or is motionless. Also such a servo system provides for orthogonal isolation between (the magnetic influence of adjacent) servo-bits and data bits so recorded. This invention provides the same advantages while eliminating the need for a separate servo track. Other approaches are known which involve separate servo tracks (e.g., U.S. Pat. No. 4,007,493 to Behr, et al.; U.S. Pat. No. 3,964,094 to Hart; U.S. Pat. No. 3,678,220 to Luhrs and U.S. Pat. No. 4,074,328 to Hardwick); where, by contrast, systems according to the invention do not.

Workers are aware of present-day magnetic recording systems that use prerecorded servo tracks (e.g., see U.S. Pat. Nos. 3,903,545 to Beecroft, et al.; 2,938,962 to Konins, et al.; 3,404,392, to Sordello; and 3,185,972 to Sippel). One implementation involves a stacked multi-gap transducer adapted to register an intermediate head-gap over a "selected" data track while using a pair of flanking gaps to read servo bits from a pair of servo tracks flanking each data track.

Invention features:

The present invention is a significant improvement over such techniques, teaching the use of a di-gap transducer array, to generate "LAMBDA" servo marks, as well as data marks, with a gap pair oriented to be orthogonal to one another as well as disposed "in-line", along track-direction. These gaps are adapted to conjunctively read two different kinds of (data/servo) bit sets arranged along the track; one kind aligned with one such gap, the other kind at right angles and thus aligned with the other gap. The servo-bit locations may indicate head-misregistration and, as detected, do so in terms of elapsed time between prescribed servo signals along any given track—as opposed to complex, fussy frequency modulation systems or amplitude modulation systems.

According to one embodiment, "V-shaped" servo positioning signals are interspersed among data-bits and detected with a single "di-gap" transducer head. ["Di-gap head" hereinafter referring to a pair of positionally-related magnetic transducer heads, each head comprising a pair of pole pieces separated by a transducing gap and would with an associated coil-activation circuit—though the windings and one pole-piece may, of course, be shared]. Workers will recognize the advantages of this approach; for instance, eliminating the need for separate servo heads and recording operations—as opposed to the prerecorded ("initialized") disks in common use today.

Of course, others have contemplated the use of "orthogonal data tracks" (e.g., see the cited Sippel patent). Likewise, others have thought about monitoring head registration according to the alignment of a transducer gap relative to an array of parallel magnetic domains arranged diagonally across a recording track (e.g., see the "herringbone" servo tracks and related detection technique taught in U.S. Pat. No. 3,686,649 to Behr).

However, the instant "track-on-data" arrangement with "LAMBDA" indicia will be distinguished as novel and unexpectedly effective; especially as combined with the mentioned "herringbone" pattern of bits and associated di-gaps.

In a preferred embodiment for instance, the work-bits are impressed "skewed", at a prescribed angle oblique to track direction, while "LAMBDA" servo-bits are arranged along the same track with their magnetic domains aligned transverse to these "work domains" and disposed at prescribed regular intervals along the track. Such work-bits and servo bits are oriented to interact with a common double-gap transducer unit, one magnetic gap aligning parallel to the work-bits, the other aligning parallel with the servo bits, —thereby maximizing the respective data output and servo output signals. Such a system obviously maintains a fixed spatial relation between data transducer and servo transducer very conveniently, as well as keeping them inherently synchronized (that is, they traverse the medium at the same speed and direction).

According to a preferred embodiment this arrangement is capable of easily providing "registration feedback". That is, with this technique and associated apparatus, the multi-gap transducer head may be registration-referenced to the contemplated magnetic recording medium (moving along a prescribed direction), and may be repositioned for centering therealong.

At least one gap pair is used, with the paired work gap and servo-gap both skewed vs. the track axis and transverse to one another. The servo output is coupled to a head-positioning arrangement adapted to reposition the gap pair radially on a disk for centering over a selected track. Preferably, the servo-bits, (head positioning information) as well as "work-bits" are both recorded along the same track, so that the work-bits pass in alignment with one of the transducer gaps, while the servo-bits align parallel to another gap.

Thus, once the di-gap head is registered on a given track its gaps should register with the servo-bits and the work-bits respectively so as to generate respective servo signals and data signals. According to this feature, either gap may handle either signal.

Preferably, the gap sensing servo-bits will provide a servo output reflecting the time interval between successive servo-bits—this, in turn, reflecting any shift in head position to the left or right of the track center line. Preferably, the servo signals "follow" the transit time of the head; accordingly, the servo output may be interpreted as a distance-indicating signal whose variance from a prescribed norm (representing perfectly registered, or centered, head over a subject track) represents the lateral head variance or misregistration and thus may be used to cause a responsive servo system to reposition and center the head (known systems which seek a "zero error" feedback signal). Such a servo output control over the radial positioning of the head can be implemented, using conventional servo means, known in the art.

The servo output is compared with a reference signal representing "registration" (centered alignment of the head along the track—e.g., via "Table-Lookup") to derive a servo controlling "difference" (error) signal controlling the servo to correct by repositioning the transducer leftward or rightward to achieve "zero-error" (i.e., registration).

Preferably, such an arrangement is used with disks having "adjacent abutting" data tracks with data bits aligned oblique and parallel along a track and orthogonally between tracks, with a respective pair of data and position gaps disposed "in line" to be translated along a selected track to develop data and servo signals both therefrom.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 2 indicates a single record track, encoded by position and disposed relative to associated transducer indicia according to a related embodiment; while FIGS. 2A, 2B and 2C indicate suggestive transducer dual-outputs for three illustrative transducer positions;

DESCRIPTION OF THE PREFERRED EMBODIMENT

Figure 1:
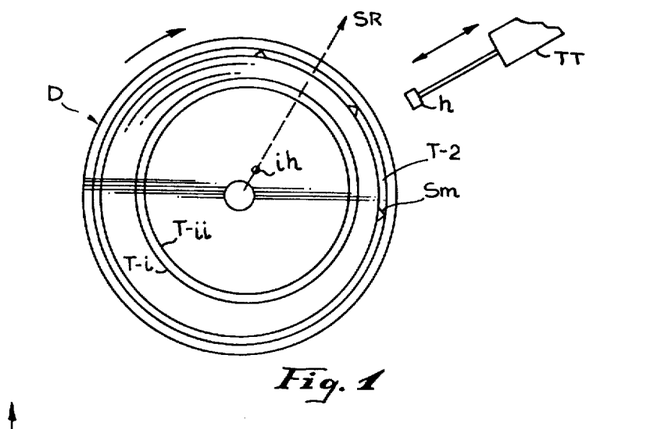
FIG. 1 is a very schematic plan view of a magnetic disk record with a simple record track indicated as position encoded according to one embodiment.

General Description, Background:

FIG. 1 schematically illustrates a magnetic recording disk D constructed according to principles of this invention. This, and other magnetic recording means discussed herein, will generally be understood as constructed and operating as presently known in the art, except where otherwise specified. Such a recording disk is relatively conventional, being about one foot in diameter and formed of a non-magnetic substrate material with a thin magnetic recording medium applied to one face.

Such disks are commonly mounted on a turntable which is seated on a precision-bearing spindle and rotated at high speed during operation. Thus, every bit along any selected circumferential track (see illustrative recording tracks T-1, T-2 and T-3 in FIG. 1A) is swept past magnetic transducer means (here, see magnetic head "h" on arm TT) many times a second for minimum access time and high speed read-out. In a commercial disk unit, one or several such disks is employed, each having one or several transducers per disk. Conventionally, record information ("work-bits") is recorded along the data tracks. One or several servo-transducer means is often provided and arranged to be operated in conjunction with special servo-tracks (or track-sectors) on which servo-data (servo bits) is recorded.

The rotational rate (rpm) of disk D is normally carefully controlled so that any small relative change in rotational speed is quickly corrected and so the magnetic reading and writing operations are kept constant. Conventionally, the rotational position of the disk is indicated by angular encoding means, clock tracks, index indicia (e.g., hole ih: along "start radius, SR", FIG. 1), or the like. Such features are conventional and not detailed here since they are not of special significance in practicing the invention.

This servo information is used to align a transducer head (here, see head "h" mounted on transducer-translator unit TT and conventionally positioned thereby) radially of disk D, i.e., with its transducer gaps registered with a given selected track on disk D, using means well known in the art (and not shown or described here). A reference radius is conventionally indicated by passage of an index indicium over a related detector (e.g., here, see index hole "ih" along "start radius" SR). Complicating this servo function are the typical deviations of disk tracks from perfect concentricity (with one another and/or with their disk). This is indicated by tracks T-i, T-ii which will be understood as out of concentricity, both with disk D and with reference track T-2.

Figure 1A:
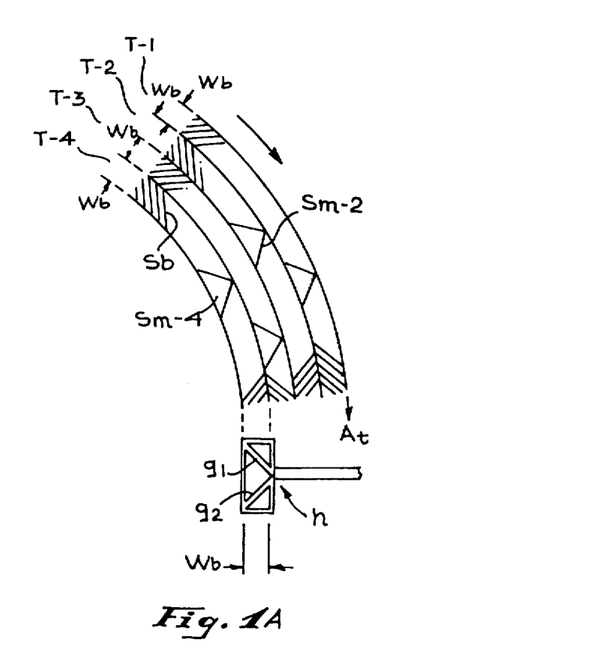
FIG. 1A showing an enlarged area of the disk as disposed relative to a di-gap transducer provided according to the invention.

Representative tracks of disk D are fragmentarily shown—exploded and with recording bits also illustrated—in FIG. 1A along with an enlarged, very schematic showing of head "h", understood as adapted for recording and detection of such bits.

As is conventional, it will be understood that work bits in the form of magnetic signals "wb" are recorded on the face of disk D by a transducer-gap provided in the transducer array (here, represented by either of the gaps "g" of "di-gap head" "h") which is appropriately positioned. Head "h" will be understood as coupled mechanically to a positioning unit (not shown) including position-actuator means arranged and controlled so that transducer "h" is translated radially across D to be operationally superposed over a selected track (very schematically indicated by head translation arm TT and generally understood in the art, hence no details are indicated or necessary).

Thus, for example, the position control can comprise a so-called "voice coil actuator", i.e., a magnetic positioning device very similar to that employed in loud speakers. Such actuators are generally preferred because they are inexpensive, fast, accurate and readily controlled with conventional circuitry. However, if desired, other mechanical, electromechanical or hydraulic positioning control means may be employed, as is well known in the art.

Work-bits "wb" will be understood as recorded along the disk tracks by appropriate energization of the related magnetic transducer gap in head "h", and to comprise a sequence of magnetic transition signals of identical encoded magnetic polarity and alignment. Here, preferably, and according to a feature aptly employed with the invention, work-bits "wb" are impressed at a common prescribed angle to be all similarly oblique with respect to the respective track axis $A_t$. (The direction of translation of the track with respect to the transducers).

According to one feature, a bit encoding scheme establishes, for each track, a prescribed alignment for work-bits and for servo-bits, this alignment being arranged to automatically indicate registration, or centering, of transducers with respect to a track). For instance, for tracks T-1, T-2, T-3, etc., in FIG. 1A, it will be understood that the work bits "wb" are aligned in one oblique direction along all "odd-number" tracks (e.g., T-1, T-3) and aligned transversely in all "even-number" tracks (e.g., T-2). The servo-bits "sm" are aligned semi-orthogonal to the work-bits along any given track. Bits "sm" will be characterized as "centering di-bits" as explained below and will be understood as "LAMBDA-configured" relative to the track—i.e., like "A", as for a Greek (capital) LAMBDA (or like its inverse: "V"; e.g., in contradistinction with "tilted-V" marks, or "<",">" i.e., the mathematical signs for inequality—such as shown in U.S. Pat. No. 4,074,328 to Hardwick).

These recording tracks will be understood as schematically represented here by a mere sector of the full disk/track circumference; there being a great number of such tracks understood as concentrically arranged, in abutment, on disk D. Each of the concentric recording tracks is distinct in location, length and curvature and the transducer and associated gaps must be very precisely registered thereon before writing or reading may be properly performed—as workers in the art very well know.

Thus, in order to position a transducer gap in operative (read/write) relation above a selected track, the position of the transducer head must be detected and checked for "centering" along this track. Conventionally, a raw position signal would be compared with a reference signal which represents the "centered" (or registered) head position. Any discrepancy between these indicates the degree of misregistration and is processed to result in an "error signal" fed back to a position controller (in a conventional servo loop) for precise repositioning and control of the head.

In some known systems, track location is indicated by "servo-bit" magnetic transitions provided along special dedicated servo tracks, of a disk. In one well known system, such servo-bits are recorded along special servo tracks disposed between adjacent data tracks, as suggested, for instance, in the cited U.S. Pat. No. 3,686,649 to Behr. By contrast, in the subject embodiments, the data tracks are abutted (radially) with the bits aligned to be orthogonal between adjacent tracks—doing away with intervening spaces for servo tracks, guard-bands, etc.

Such a "radially-abutting" track configuration will be recognized as facilitating maximum track density. However, this makes it necessary to record servo information bits along a portion of the data tracks. It also makes it critical that the read/write gaps be positioned very accurately, since a transducer gap might otherwise easily drift over an adacent recording track. These requirements are met in systems according to the invention, with a "di-gap/di-bit" servo control described hereinafter. That is, a transducer is provided with a pair of skewed orthogonal gaps, [such as gaps $g_1$, $g_2$ of head "h" in FIG. 1A]; and related servo bits are recorded to comprise at least one pair of similarly-skewed, mutually-orthogonal servo-bits [such as servo-bits "sm" in FIGS. 1 and 1A].

FIG. 1 embodiment:

Turning to the details of FIGS. 1 and 1A, the indicated magnetic transducing arrangement will be understood as adapted to operate upon the abutting concentric data tracks T-1, T-2, T-3, etc., of a magnetic recording disk D, when the disk is rotated in the known manner. Servo-bits "sm" in the form of skewed, mutually-orthogonal di-bits "A" will be understood as distributed in a prescribed manner along each given track T, being inserted among the work-bits "wb", along with (track/-sector) identifying bits "sb". Work-bits "wb" are aligned in parallel, and similarly skewed, along every track, being "orthogonal" between adjacent tracks (i.e., they are "skewed and adjacent-orthogonal"). This magnetic information will be understood as conventionally recorded and sensed. Such is indicated suggestively by "di-gap" read/write head "h" adapted to be moved radially across disk D to any selected track-location where the transducer gaps will ie superposed above a "selected" track T and centered therealong in close "read/write relation" therewith (see FIG. 1A).

According to one recited feature, head "h" includes at least one "di-gap" array; i.e., a pair of skewed orthogonal gaps $g_1$, $g_2$. Head "h" has a width $w_h$ approximately equal to the (uniform) radial width of $w_t$ of the tracks. Thus, when head "h" is moved into prescribed registration (exactly-centered relation) with a given track T, one of its gaps "g" will align and superpose coincidently with one set of bits (—either "wb" or "sb"; or one half of "A" di-bits "sm", these bits extending across the track in a "first" skew-alignment—) while the companion gap will be similarly aligned with a second set of bits orthogonal to the first. Thus, gap $g_1$ in FIG. 1A, passing along track T-4, (or any "even-no.-track") aligns with "track-sector identifying" bits "sb", and with one of the servo di-bits "sm", while the other gap $g_2$ will align with work-bits "wb", and with the other half of di-bit "sm". Conversely shifting head "h" to be centered along track T-1 (or any "odd-no.-track") will reverse this registration-relation, e.g., $g_1$, aligning with the work-bits "wb", there.

The "magnetic congruency" of such a di-gap transducer and such servo di-bits, (or "chevrons") when a head is centered over a recording track will be seen as facilitating advantageous servo control—with the degree of off-centering, or misregistration, being sensed according to how closely such a di-bit "fits" the passing di-gap—as further described and explained below. This concept will also be better understood upon consideration of the alternate array in FIG. 2 described as follows.

Figures 2, 2A, 2B, 2C:
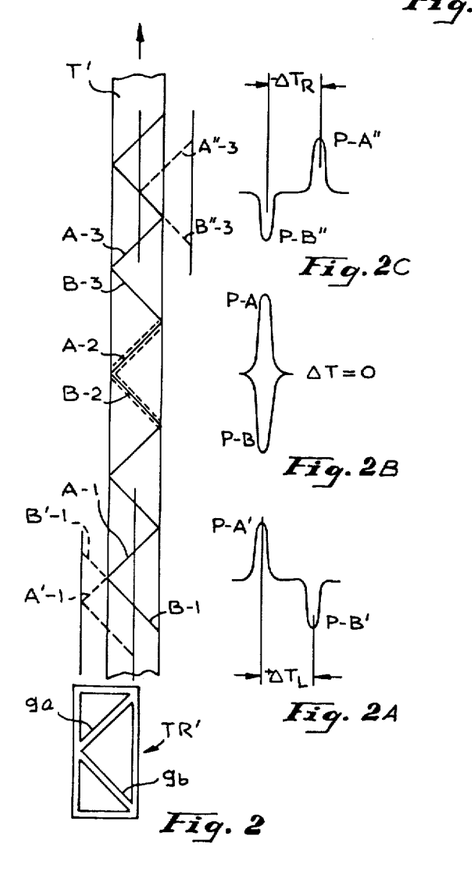

FIG. 2:

Here, a "di-bit" data track T' is shown in operative relation with an associated "di-gap" transducer assembly TR' understood as passing over representative track T' in the direction of the arrow, in magnetically operative relation with bits A, B, therealong, but in slight misregistration, with respect thereto (misregistered "to the left"). Transducer TR' thus includes a pair of skewed, mutually-orthogonal tranducer gaps $g_a$, $g_b$ aligned oblique (here, preferably 45°) to the axis of track T'. Track segment T' may be understood as a servo-sector like these indicated in FIGS. 1, 1A with similar "di-bits", comprised of relatively orthogonal first and second di-bit-halves, (i.e., magnetic recording half-bits A and B respectively, analogous to servo di-bits "sm" above). Di-bits A, B will be understood as each aligned with a respective transducer gap ($g_a$, $g_b$) and thus orthogonal to one another and oblique (also 45°, preferably) to the track direction (arrow). Track sector T' shows only servo bits and no work-bits, and is here represented as "linear" rather than "curvilinear" (as the actual face of a magnetic recording disk would be)—but only to simplify the explanation. Those skilled in the art will obviously extend the principles explained to curved disk tracks, and other relevant media, including work-bits too, as a matter of course.

Now, it should be understood that the relative disposition of the bi-bit pair A, B and gaps $g_a$, $g_b$ (their spacing and relative angular orientation) is such as to render "magnetic congruency" between a bit and a respective gap when head TR' is centered exactly (registered) along track T'. Thus gap $g_a$ will coincide with bit A and gap $g_b$ will coincide with bit B at a certain time during track passage—and the detecting transducers will thereupon generate a corresponding pair of coincident opposed "servo-output" pulses. A relatively perfect congruence of di-gaps and di-bits is signalled in FIG. 2B by the simultaneity of symmetrically-opposed pulses P-A, P-B representing detection of bits A-1, B-1, by head TR'; pulse amplitude may be equal, but this is not always necessary, though it facilitates a "null-balance" indication of perfect registration, of course, as workers will recognize). This opposite polarity output is readily rendered by known methods.

On the other hand, a slight misregistration of head TR' to the left, as depicted in FIG. 2, should produce the kind of (successive, spaced) non-coincident output pulses indicated in FIG. 2A wherein pulse P-A' (produced by passage of gap $g_a$ over bit A-1) will obviously occur somewhat earlier in time than the companion output pulse P-B'—P-B' reflecting the later passage of gap $g_b$ over companion bit B-1. And, the time-discrepancy + $\Delta T_L$) between output pulses will be a measure of the degree of head misregistration (the positive sign indicating misregistry to the left), as workers in the art will appreciate.

Conversely, rightward misregistration of transducer TR' is signalled in FIG. 2C (such head misregistry not shown here, but indicated schematically by "phantom bits" A"-3, B"-3 in FIG. 2) by the non-coincident servo (timing) pulses P-A", P-B". Here, output pulse P-B" from gap $g_b$ "leads" output pulse P-A" from companion gap $g_a$ by a time delay $(-\Delta T_R)$ which corresponds to the degree of rightward misregistration (and accordingly is designated as negative delay time).

Workers will visualize other like arrangements for correcting head misregistration wherein transducer di-gaps align oblique to the transport direction can likewise interact with associated (similarly oblique) di-bits so that exact head/track registration is indicated by coincidence of the paired output pulses, while misregistration is indicated by positive or negative non-coincidence. In certain cases such servo-bits may, themselves, consititute work-bits ("record data"), especially where the work-bits are skewed 90° between adjacent tracks (as in FIGS. 1 and 2).

Figure 4:
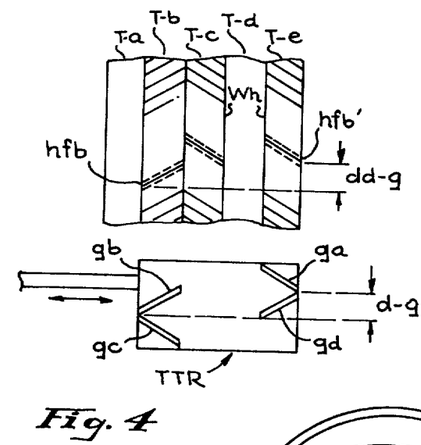
FIG. 4 illustrates, in plan view and greatly enlarged, a schematized fragmentary showing of a set of tracks like those in FIG. 3 as related to "double di-gap" transducer means and data bits indicated according to another embodiment.

This is indicated very schematically in FIG. 4 where segments of abutting adjacent disk tracks T-a, T-b, T-c, T-d, T-e is depicted as comprising skewed work-bits "wb" which are "orthogonal adjacent". According to this feature, periodically a high-frequency burst of "special-bits", hfb, hfb'—similarly skewed—are laid down for head-centering purposes. Workers will appreciate that bits hfb, hfb' may substitute for di-bits like "sm" above. It will be evident, that, according to another mode of "di-gap/di-bit" operation a transducer such as TTR with at least one related di-gap pair (see orthogonal gaps $g_a$, $g_b$) may be provided, with the gaps spaced "across tracks" (rather than "along a track" as above) by a prescribed (odd) number of track widths (here, there—this distance accommodating reasonable gap spacing and head manufacturing tolerances). Di-gap $g_a$, $g_b$ will sense the high-frequency bit pair hfb, hfb' coincidently as an indication that head TR is perfectly centered over tracks (T-b, T-e); non-coincidence indicating misregistry, as before.

It will be evident that the di-bit pair can be variously offset in space (e.g., by offset spacing dd-g, the same as offset d-g between gaps $g_a$, $g_b$) or offset in time (electronically)—gap-to-bit coincidence being provided for either spatially or electronically. Of course, such "work-bits" may be otherwise modified and distinguished to thus serve as "servo-bits"—for instance, written as "invalid bits" (e.g., preceded by three or more (3+) "zeros") or as "special bits".

Also, the head TTR may include a second orthogonal gap pair (here, $g_c$, $g_d$) to accommodate the sensing of work-bits in other tracks (e.g., T-a, T-c, T-e for $g_c$; T-b, T-d, etc., for $g_d$). These second gaps are not needed however and will typically be included only where cost-justified.

Similarly, one oblique gap may be translated along such a track to detect certain aligned servo bits and to generate servo-positioning pulses, with these pulse signals "referenced to center" according to their degree of coincidence with a prerecorded set of "clock signals". The servo output may be time-referenced to such clock signals (indicating "center-track registration" of the servo gap) and thus eliminate the need for contemporaneous detection of a second servo-bit with a second orthogonal gap, as described above. In certain cases (e.g., FIG. 1A) part of a track-sector will include only servo-bits, with abutting "blank track segments" flanking the sector radially, to eliminate risk of noise. This is preferred for this "track-on-data" operation and maximizes data compression.

In any event, the foregoing techniques will be appreciated as facilitating a true "track-on-data", or "servo-on-data" operation, locating the servo-bits directly adjacent their associated data bits and avoiding the difficulties and errors of remotely-located servo indicia.

Operation:

Returning now to FIGS. 1 and 1A, it will be apparent that a simple, convenient mode of operation may be used to develop "centering information" from servo di-bits "sm" by proper positioning and manipulation of the associated set of skewed di-gaps $g_1$, $g_2$ of head "h". Generally speaking, this will involve head "h" being coarsely-positioned over a given "selected" track; then the servo di-bits being sensed for their degree of congruence with di-gaps $g_1$, $g_2$, so that any minor centering-adjustments necessary can then be made—then, with registration thus assured, optimal data transfer (read-out or writing) may proceed.

More particularly, an illustrative, step-by-step servo sequence is now described as follows (see FIG. 1):

Assumptions:

The control memory will contain a formatting code indicating the "normal" position (i.e., associated delay-time post "start time") of servo-bits "sm" on each disk track when the head is "centered" there. As FIG. 1 indicates, servo-bits "sm" are distributed about each track T [preferably at the "preamble" to each "data sector", being followed there by "identification bits" "sb", then by the record data (workbits "wb")] using a frequency matched to servo response. That is, for a given medium velocity, the servo system will have a certain nominal response time for carrying out headcentering position adjustments. For instance, it may be able to complete a repositioning sequence within about 1/10 of a disk revolution—accordingly bits "sm" should be disposed every 36°, or less, for optimal servo response.

Bits "sm" may be prerecorded when a disk is "initialized". Also the format for orientation of work-bits "wb" will be predesignated so that, for instance, bits "wb" will be aligned with gap $g_1$ for all the "odd number" tracks (T-1, T-3, etc.), and aligned with gap $g_2$ for all the "even number" tracks (T-2, T-4, etc.).

And preferably, the servo-bit preamble to each sector, such as indicated at di-bit "sm" in FIG. 1A, will be arranged so that the adjacent abutting track segments are "blank", with no bits recorded thereon, thus avoiding interfering pickup if head "h" is misregistered along a sector-preamble. The "servo preambles" for alternate tracks may be aligned along a common radial-direction as in FIG. 1A, or else be offset rotationally so as not to interfere with this operation.

First step: Head "h" enters the track area and is roughly centered by coarse positioning means (known, not described) over "selected" track T-4. Now a "centering sequence" is invoked before any data transfer (i.e., "read-out" or "write-in") is attempted;

Second step: At an appropriate "start time" (e.g., following the passage of index hole "ih", as is well known in the art), the servo control stage will begin to monitor the output from gaps $g_1$, $g_2$ to "look for" di-bit sensing and related "servo output" for both transducers. That is, the next following prerecorded servo di-bit or "chevron", "sm" will initiate this servo output (as in FIGS. 2A, 2B, 2C) and be used to identify the track, data block, etc., as well as in a "centering check".

Third step: Centering of head "h" takes place responsive to the output sensed from chevron "sm"-4 (functionally, along the lines indicated elsewhere). Thus, if one servo output pulse is significantly (e.g., beyond a given range) out of coincidence with the other servo output pulse, head "h" will be shifted to correct this—then, with the gaps properly centered, the centeringcheck is repeated, data block identified, etc., and—finally—read out of work-bits may begin.

Fourth step: With the gaps now properly "registered" with the bits along "selected" track T-4 (FIG. 1A) optimal, accurate data transfer may begin. Accordingly, the gap $g_1$ output might then be gated to read-out the track number and sector number indicated by (aligned) sector bits "sb"; and thereafter to read-out the work-bits "wb" sensed by companion gap $g_2$.

Workers will appreciate how simple such a servo centering technique is and how it assures that the head is centered over a track before any read-out may begin. This maximizes the gap/bit congruency and the associated accuracy and efficiency of bit detection and/or writing, while at the same time accommodating maximum track density with less concern for head misalignment.

More particularly, a known digital servo system may be set to invoke a certain number of "positioning steps" when translating head "h" fully across a track width (e.g., 30 steps to cross a bit-track completely). And a "centered" limit may be set such that a certain minor misregistration is tolerated (e.g., up to 3 servo steps, or the "time disparity" $T_L$ between di-gap output pulses which corresponds to this, as indicated in FIG. 2 above).

Workers will recognize that servo response to the misregistration (of the di-gaps with the servo di-bits) detected may be a relatively gradual and continual thing. That is, with many sectors and associated sector-preambles normally occurring along a given track, the servo positioning means may be referenced to "coincident di-gap output" several times per disk revolution, with head "h" being responsively "recentered", to some extent, each time a servo di-bit passes. This facilitates a smoother, more gradual and continuous, "centering" mode as workers will appreciate. It also helps to compensate for disk eccentricity and "run-out" along any given track—something quite complex and difficult to accommodate with conventional means.

Eccentric tracks:

Workers will recognize various applications of the above features; for instance, when tracks are recorded in parallel about a disk to be out of "concentricity" with the disk somewhat. Such "eccentric tracks" are familiar to workers and occur not infrequently (e.g., due to local variations in turntable/shift alignment, etc.). Such are illustrated by eccentric tracks T-i, T-ii, in FIG. 1.

Figure 7:
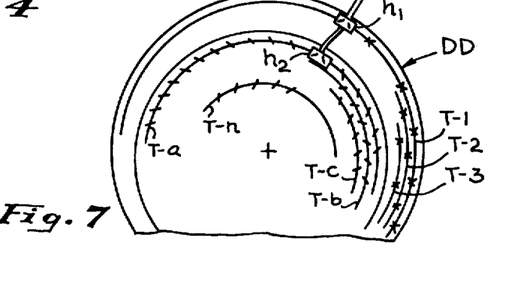
FIG. 7 is a plan view of a disk record as in FIG. 1, schematically indicating a related mode of recording position bits.

A solution to this problem, along the lines taught, is suggested in FIG. 7 where a pair of di-gap heads $h_1$, $h_2$ are mounted in tandem to simultaneously operate on two respective tracks on a disk DD—one track T-1 being one of several carefully centered "prerecorded servo tracks" (or sectors); the other being a new data track (e.g., T-a), whose concentricity is to be assured. Accordingly, it will be evident that head $h_2$ may be "slaved" to head $h_1$ and be servo-centered therewith, so that when head $h_1$ is registered on a "control servo track" (or track segment T-1, using di-gap/di-bit sensing as taught above), head $h_2$ will "follow" and write a related data track which is concentric with T-1 and with disk DD (e.g., T-a "slaved" to T-1, T-b slaved to T-2, etc.). Further, a "bootstrap mode" may be used whereby certain other new data tracks are, in turn, likewise "slaved", during writing, to (the position of) a respective "first-written" data track (e.g., T-n and head $h_2$ slaved to T-1 and head $h_1$).

Min/max misregistration:

A maximum tolerable misregistration may be built-in to the system by limiting the minimum acceptable amplitude of the servo di-bit read-out. For instance, 50% misregistration (or 15 "servo-steps" misregistry as above) might be the maximum centering error tolerable; in such case the gaps would be "straddling" two adjacent tracks and the nominal amplitude of the servo read-out pulse corresponding to this might be about 50% of the maximum "fully-centered" read-out amplitude.

In such a case, (and in any instance where a head is so "straddling") the servo control program might be set to arbitrarily command the head to take predetermined corrective action (e.g., "move radially-out ten steps and begin a new centering sequence"). In a related situation, if satisfactory centering were achieved over the wrong track; then upon reading the track number (sensing bits "sb") this would be discovered and no harm done (e.g., no erroneous data readout would be accepted)—instead, an entirely new "coarse positioning" step could be invoked to re-new the search sequence for the correct selected track. Workers in the art will conceive other conventional ways of handling similar problems using the invention.

Workers will also conceive other ways of employing such servo di-bits. For instance, as described below relative to FIGS. 3 and 3A, one or both oblique portions of a servo di-bit may be interspersed with, or "overwritten" upon, work-bits.

Figure 3:
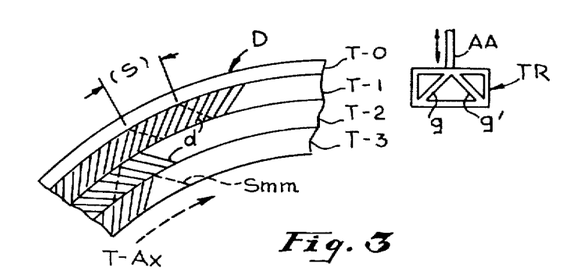
FIG. 3 illustrates a fragmentary plan view of a portion of another magnetic disk record, greatly enlarged, with adjacent tracks and magnetic domains, including another position indicia embodiment therein schematically indicated in positional relation with an associated "di-gap" magnetic transducer; an enlarged showing of one of these tracks and the associated transducer being indicated in FIG. 3A and related indication of illustrative transducer outputs in FIG. 3B.
Figure 3A:
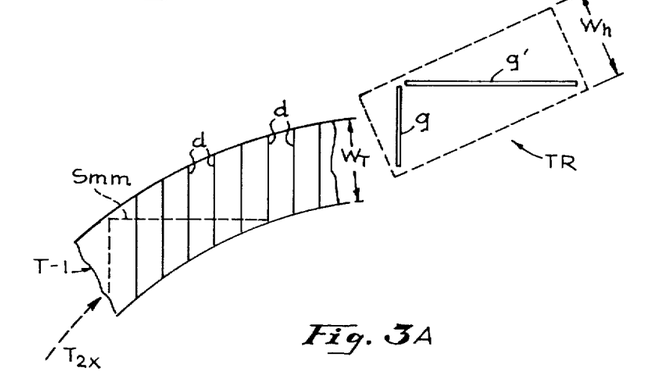

FIG. 3:

A modified, further improved way of using a skewed orthogonal di-gap transducer, together with similarly-skewed servo-bits is indicated in the embodiment of FIGS. 3 and 3A. Here, a rotatable magnetic disk record D is shown very schematically, with abutting recording tracks (e.g., T-1, T-2, T-3) along which indicated "work-bits" "d" may be recorded as above. Bits "d" will be understood as aligned in parallel oblique to the transport direction (arrow T-$A_X$) and orthogonal between adjacent tracks. A series of "singular" skewed servo-bits "smm" (not di-bits) are here "writtenover", or interspersed among, certain work-bits "d" and orthogonal thereto according to this feature. A di-gap head TR may be used for transducing as before.

Workers will appreciate such a "track-on-data" scheme—with a di-gap head operating on "di-bit tracks" (here, the servo-bits and work-bits cooperate—not pairs of servo-bits) as quite new and advantageous—and one that may be implemented in various ways. The magnetizations represented by these bits and their respective magnetic direction are (as above), indicated schematically by the parallel lines "d", "smm". The "orthogonality" between bits may be visualized as a 90° rotation of the magnetic axis of the pre-magnetized domains on the virgin substrate.

Except as otherwise described disk D and associated di-gap head TR (with skewed orthogonal gaps g, g' and accessories, like access arm AA, etc.) will be understood as conventional and similar to those described above with respect to FIG. 1. Thus, the orthongal skewed transducer di-gaps g, g' are disposed and adapted to be aligned in "magnetic congruence", or registration, with either of bits "d" or bits "smm" (head TR having a width $w_h$ approximately equal to the width $w_t$ of the tracks T). Thus, bits "smm" indicated in phantom in FIGS. 3, 3A will be understood as impressed in a prescribed manner over a track sector corresponding to a prescribed plurality of transverse workbits "d" (—rather than being allocated to separate tracks and/or to separate portions of a data track). Here, servobits "smm" span four (4) work-bit sites, for example.

As mentioned above, bits "d", "smm" are skewed, i.e., with respect to "translation axis" T-A$_X$, at angles $\phi$ and $\phi'$ respectively (these preferably being +45° and −45° with respect to TA and thus transverse to one another) and are at right angles with like respective bits from "trackto-track". Such an "adjacent orthogonal/transverse within track" bit array has been described above. Accordingly, as head TR moves radially across disk D, it will be understood as traversing successive disk tracks to stop "semi-registered" over a selected track; then the bits "d", "smm" will be detected by the passing gap that happens to be aligned therewith and "fine-registration" will follow.

Thus, for instance, when head TR is positioned so that gap "g" overlies track T-1 it will be relatively perfectly aligned to record and/or read work-bits "d" with maximum efficiency (being parallel thereto and "magnetically congruent" when superposed)—while companion gap g', aligned transverse to gap "g", will accordingly be oriented for no significant magnetic interaction with bits "d", and for maximal interaction with bits "smm" (gap "g", in turn, being relatively unresponsive to bits "smm").

Likewise, shifting of head TR to overlie track T-2 will reverse the operative sense of gaps g, g' so that gap g' is uniquely operative with data bits "d", (which are orthogonal to the work-bits "d" along track T-1), while gap "g" lies in exclusive operative alignment with servo-bits "smm". Shifting again to register TR along track T-3 will again reverse the operative senses of the gaps (so they are the same as for T-1).

Workers will understand that the recording and reading is performed conventionally, with narrow magnetic gaps g, g' traversing domains in switching-relation so that if a domain ("bit") is aligned relatively parallel to a given gap and translated there-past in "magnetic congruence", a full-scale read-out signal will be induced from the associated transducer reflecting this passage. The polarity of the induced signal will depend, of course, upon the direction of change of magnetic transition.

According to a feature hereof, the distance interval between a pair of adjacent servo-bits along a given track (see interval S between bits "smm" along track T-1 in FIG. 3) will correspond to a prescribed "reference interval", reflecting a prescribed controlled head/disk velocity. When a perfectly registered (or centered) transducer proceeds along the subject track at the prescribed constant speed, servo output pulses "sop" will issue at prescribed times. These times may be represented as $t_0+t$, ($t_0+t_1$, $t_0+t_2$, etc.) reflecting the position of servo bits "smm" with respect to a fixed standard (e.g., Start Radius SR, see FIG. 1; as known in the art—to indicating radius SR). According to a feature hereof, misregistration of the transducer gaps may be detected in terms of time-variations from these "reference times" sensed from associated output servo signals (e.g., $t_0+t_1+t_\nu$; $t_0+t_2+t_\nu$, etc.).

Such a misregistration is very schematically indicated in FIG. 3A where transducer gaps g, g' of head assembly TR are misregistered "leftward" of track T-1 (assuming the gaps pass in the direction indicated by the arrow), or displaced "radially outward" of disk D. Track T-1 will be understood to include work-bits aligned to be sensed by gap "g", plus transverse servo-bits "smm" aligned to be sensed by gap g'. Such "leftward misregistration" of head TR will be noted as causing gap g' to intersect (a portion of) servo-bits "smm" somewhat "late" and produce an associated servo output pulse "later" in time (delay $\Delta = +t_\nu$) than the case where gaps g, g' are centered exactly along track T-1. Conversely, "rightward" misregistration of gaps g, g' would cause the g' output to occur "sooner" (delay $\Delta = -t_\nu$). Comparison of either such misregistered servo output pulse with a train of "reference pulses" representing the "centered head" (or registration) condition, will yield a time difference value $\pm \Delta t$ which may be used to determine the direction, and degree, of misregistration—as workers can visualize (see FIG. 2 description details).

Workers will recognize that such an "orthogonal" magnetic "overwrite" of servo-bits (upon work-bits will, if the bits are substantially orthogonal), render each bit type uniquely responsive to only one of the di-gaps and magnetically isolated from the other bit type. That is, as workers in the art well know, a bit disposed transverse to a transducer gap is relatively "de-coupled", magnetically therefrom and non-responsive thereto. Also, adjacent orthogonal magnetic domains have relatively little significant magnetic interaction with one another.

For instance, consider bit "smm", in FIG. 3A: the net effect of its magnetic domains will be to produce a relatively strong magnetic output signal (sharp magnetic transition when gap g' passes over "smm" in operative magnetic relation or "magnetic congruence", therewith), while being relatively isolated from (no significant magnetic interaction with) "orthogonal" magnetic domains "d" and essentially, "ignored" by passing orthogonal transducer gap "g" (no output induced therefrom). Conversely, gap "g" will produce no significant servo output signal from the passage of bit "smm"; but only from passage of "d".

Restating this from a somewhat different viewpoint, the instant a servo-bit "smm" passes in perfect registration under gap g', it will (momentarily) essentially "fill" the gap 100% with magnetic flux from its magnetic domains (—here aligned in an East-West direction, and constituting an "E-W flux").

The transverse magnetic domains "d", will (especially if they are widely spaced so that only a few intersect bit "smm") present a transverse ("N-S") flux—a flux that fills only a relatively small portion of elongate gap g'(here the "servo-gap"). And their transverse ("North-South") magnetic alignment will have little or no interaction with the "smm" (E-W aligned) domains. As a consequence, bits "smm"will be relatively "isolated", magnetically, from bits "d" along the track; also bits "smm" can generate a servo output, upon passage of gap g' that is relatively independent of bits "d" and of associated "work gap" "g".

Workers may wonder whether misregistration of the transducer head can seriously degrade read-out from a "selected" track and/or introduce "error signals" from bits along the adjacent track—since the tracks are abutted together. For instance, in the embodiment of FIGS. 3, 3A, misregistration of gap g' to the right (or radially-inward from T-1) would overlap track T-2. This would likely a attenuate the "T-1 servo output" (from servo-bits "smm" along track T-1,—to the extent g' is out of "congruence" with gap g') as well as erroneously induce a pick-up in g' from work-bits "d" in adjacent track T-2 (—to the extent they register with g').

But, workers are quite familiar with known techniques adaptable to distinguish such servo-bits from such work-bits. For instance, the work-bits may be recorded at a particular high frequency, and/or be spaced closer together than servo-bits. In such a case the work-bit read-out can readily be filtered-out by conventional frequency discrimination techniques—the servo-bits along a given track being referenced to a prescribed known "reference spacing" (timing interval) and thus identified from the raw output pulses (e.g., the mentioned "reference pulses" from the index hole could be used for this). Also, (as above mentioned) MIN-amplitude discrimination can set a limit on which signals are accepted after such misregistration.

By contrast it will be appreciated that servo di-bits (chevrons) like those indicated in FIGS. 1 and 2 are, for some purposes, more desirable and efficient than single servo-bits—for instance, they are "self-referencing", in the sense of needing no external "reference pulse train" for such purposes. For instance, a control servo pulse train for each track may be stored in "memory" and keyed to the track number and to a prescribed disk rpm. Those may be used as the "reference pulses" to be compared with the raw servo pulses, with any associated errors (lead-time or lag-time) computed with reference thereto.

The significance of the aforementioned dual-gap transducer array and the associated "adjacent orthogonal" alignment of data/servo bits and recording tracks will be evident. Such a "di-bit/di-gap" type "track-on-data" technique is contemplated in the described, and other related recording/servo positioning systems. Such systems will be better understood by consideration of the explanation indicated in FIG. 3B and described below as follows.

Figure 3B:
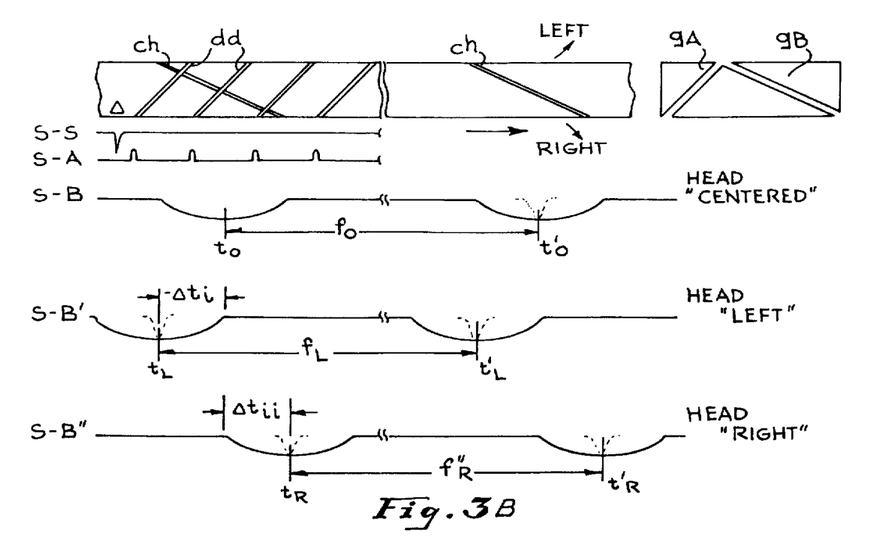

FIG. 3B:

An arrangement like that of FIG. 3, 3A is very schematically shown in FIG. 3B wherein similar data magnetic bits "dd" are obliquely aligned along the indicated track segment, with transverse singular "servo" bits "ch" similarly arranged at selected regular intervals along the track, but aligned orthogonal to data bits "dd", and laid across several of them. Here, (as above) it will be understood that a di-gap transducer arrangement will present two gaps, each to be uniquely parallel and aligned with bits from only one set (see gap $g_a$ for work-bits "dd", and gap $g_b$ for servo-bits "ch" in FIG. 3B). The "data output pulses" (when bits "dd" are sensed by $g_a$) are represented in idealized fashion by pulse train S-A in prescribed chronological/spatial relation with the depiction of work-bits "dd". A related train of "centered" "servo output pulses" S-B is similarly chronological and spatially referenced to servo-bits "ch", (the output from gap $g_b$). It will be understood that, when exactly "centered", gap $g_b$ detects successive servo-bits "ch" to produce the pulses S-B, peaking at the indicated times ($t_o, t_o'$, etc.) separated by prescribed normal clock interval, or frequency $f_o$ (reflecting the corresponding spacing and relative transition speed of the servo-bits relative to gap $g_b$). But if the head is "shifted left", off-center, then a time shifted pulse train S-B' will be generated; whereas a "shift-right" will generate pulse train S-B".

In light of the above explanation, workers will recognize that misregistration of the di-gap transducer assembly (particularly gap $g_b$ therein) to the left of the indicated translation direction (see directional arrow on the track FIG. 3B) will produce a train of clock pulses S-B' which will lead the normal "registration-train S-B by a prescribed "error time"($-\Delta t_i$), the magnitude of which is proportional to the degree of (leftward) misregistration (note negative value of $\Delta t_i$ indicating "leftward error", i.e., a "leading relation to time $t_o$); whereas a rightward misregistration is indicated by pulse train S-B", namely servo pulses which lag the normal pulse time $t_o$ by prescribed positive error-time ($+\Delta t_{ii}$). As before, one may "center" the transducer simply by comparing the raw servo output [S-B' or S-B"] with a "reference pulse" train [S-B; e.g., stored in memory and issue in prescribed time-relation with the "index pulse"[, and using the time-difference ($\pm \Delta t$) to control a conventional servo system (via feedback control, etc.).

It will be appreciated that a "di-bit/di-gap; track-on-data" arrangement and technique as described in the indicated and other related recording-servo positioning systems may be advantageously employed. Such arrangements will be seen as especially advantageous in conjunction with an array of "abutting" of data tracks wherein the work-bits and servo-bits are in orthogonal relation between adjacent tracks and among themselves along a given track.

The above description has been concerned with the manner in which a di-gap head assembly may be precisely positioned among a plurality of selectable abutting track positions using di-bit indicia along the tracks. As pointed out previously, in a conventional type of magnetic disk system to which the present invention may be applied one could employ a plurality of such head assemblies, each arranged to operate with a different sub-set of such tracks—whether provided on a disk or other record medium. It will be understood that the positioning of each such head assembly relative to its data zone may be provided in the same manner as described herein. It will also be understood that, in order to more efficiently employ space on the disk, it is possible to intermingle "work-bits" with orthogonal "position bits" along a track.

However, it will ordinarily be preferred to reserve certain pre-designated "track sectors" for the servo-bits as a means of maintaining the integrity of the servo-indicia inviolate. For instance, a certain amount of "bit-creep" is unavoidable in the course of dozens of cycles of erasing and rewriting work-bits—with the result that, unless an appropriate servo-sector is so reserved, work-bits can shift in position along a track until they eventually creep into the area of the servo-bits, and become confused therewith. (Unless, of course, the entire track is erased and rewritten, including all servo-bits, with each data update, however minor).

It will also be understood that di-gap heads according to the invention will be applied as generally known in the art. One suitable, perferred type of application is suggested by control system 200 very schematically shown in FIG. 5. System 200 is generally structured and adapted to control the output from such a pair of associated transducers ($H_a, H_b$ mounted on a common head mount HM) and implement the associated head repositioning and centering. That is, system 200 includes a switch means 211 adapted to route transducer output (also input) according to which head-gap is detecting work-bits and which is detecting servo-bits. For instance, according to one preferred data format (mentioned above) servo-bits would align with one gap along all even-numbered tracks (e.g., as shown here for gap $H_a$—note arrow indicating passage of track bits) and with the other head (e.g., gap $H_b$, here) for all odd-numbered tracks—with work-bits having the reverse format (e.g., here aligned with gap $H_b$ for this even-numbered track).

Figure 5:
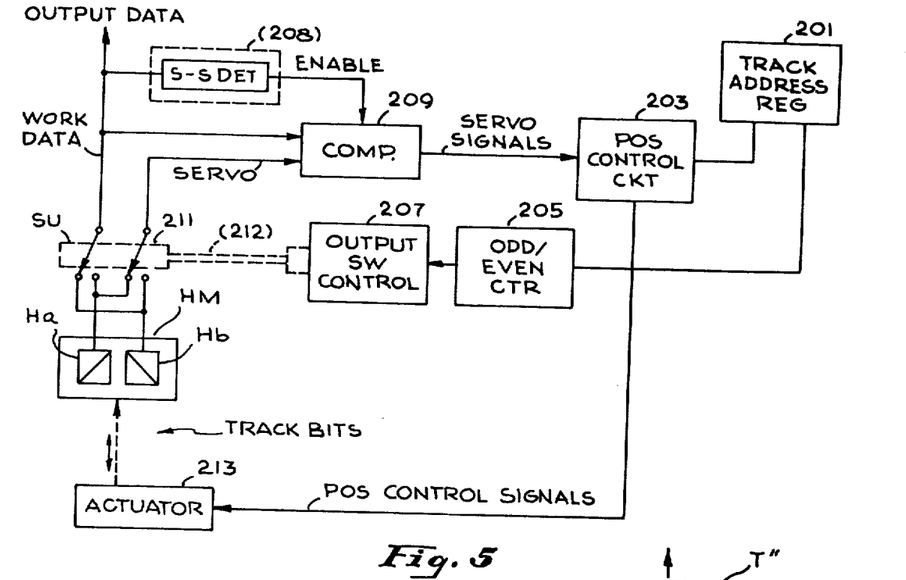
FIG. 5 is a schematic block diagram of a utilization system adapted for "di-bit/di-gap" embodiments like the above.

Accordingly, switch means 211 must be alternated between tracks to implement such a format—e.g., being controlled by an ODD-EVEN counter 205 and associated control 207 responsive to a track address register 201 as shown here. The switch means will include an actuator unit as known in the art (here, only suggested in phantom at 212) and comprise any suitable known mechanism for switching the paired-gap outputs between work-data and servo-data lines.

Such switching of the gap outputs will also involve alternately connecting each gap to a servo feedback loop, implemented as known in the art and, here suggested by comparator (COMP) stage 209 together with position control (circuitry) stage 203, controlling actuator assembly 213 to position (center) the head mount HM over a given track, as is well known in the art.

"COMP" stage 209 preferably is coupled to receive the "work-data" output also, as shown, and includes means for comparing (the synchronism of the) related orthogonal servo-bits (e.g., like marks "sm" in FIGS. 1, 1A, and generating an output (preferably amplified and digitized), representing the degree of head misregistration according to how synchronous the half-bits are (e.g., as in explanation of FIG. 2). "COMP" stage 209 is also adapted to properly enable, or "gate" this comparison output so it issues only when the desired servo-indicia are detected by the paired gaps. One means of doing this is to "gate from the servo pattern itself-"—such as by detecting an appropriate "preamble pattern" on the track, or doing so electronically "on the di-bit pattern itself"[e.g., storing di-gap output briefly in a special overflow register and gating-out the contents for servo-use only after detection of this special di-bit indicia]. Workers will contemplate specific known means for effecting this, or for alternative gating. Another gating option is illustrated in phantom at "S-S DET"(a "servo-signal detection") stage 208, which, as known in the art, is adapted to recognize this servo "di-bit"(or related indicia) and, respectively, issue an "enable" signal to so cause stage 209 to issue the mentioned servo signals, applied to "Position Control" stage 203.

Workers will appreciate how aptly such an output processing system cooperates with such "di-bit/di-gap" arrangements according to the invention. In particular, the combined "di-bit" comparing" and "output-switching" means co-act with the rest of a conventional servo system to effect efficient head-registration without the shortcomings of conventional techniques—e.g., with susceptibility to erroneous amplitude-fluctuation (e.g., due to noise, velocity shift, etc.), or to erroneous or complex velocity variations (e.g., in turntable or in delay or clock mechanisms), etc. Details of this and like implementation are well known to workers (e.g., see similar arrangements in U.S. Pat. No. 4,007,493 to Behr, et al.; U.S. Pat. Nos. 3,903,545 to Beecroft, et al.; 3,185,972 to Sippel and 3,686,649 to Behr, and in other patents cited above).

It will be understood that the preferred embodiments described herein are only exemplary, and that the invention is capable of many modifications and variations in construction, arrangement and use without departing from the spirit of the invention. For example, although it has been assumed that the normal "centered" position along a track would be indicated by indicia on the track—while this is preferable, giving real time/space control data, it is not necessary, since such indicia may be stored in memory and fed to compare means with actual position read-out, as workers can visualize.

Figure 6:
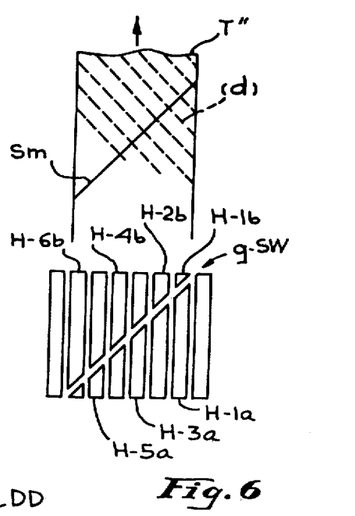
FIG. 6 is a similar to FIG. 2, indicating a modified form of position-encoded indicia and associated transducer gaps along a track.

Also, the same sort of "paired-gap" transducer array may be differently rendered; for instance, being implemented with each gap "subdivided" as indicated for the exemplary gap "g-sw" in FIG. 6. Gap "g-sw" is illustrated as straddling a portion of a typical data track "T"(see arrow) with a pair of illustrative skewed magnetic transitions "sm" (—to be transduced, as above, by gap "g-sw"—), plus a few orthogonal transitions "d"(to be transduced by the companion gap to "g-sw", not shown). Gap "g-sw" will be understood as subdivided into an approprite number of sub-gaps (six indicated here, defined, respectively, between transducer parts H-1$a$/H-1b, H-2$a$/H-$b$b, etc.). Now, as gap "g-sw" is shifted relative to a track "T", it will be apparent that some of these sub-gaps will be moved out of registry with the passing bits. Accordingly, each sub-gap may be connected to a separate output circuit (where economically feasible) which is adapted to detect "bit-registry" as a pre-condition to applying its detected data output signals to a utilization stage, in company with all other such "registry-gated" outputs. The summed "sub-outputs" will constitute the net output signal.

Further modifications of the invention are also possible. For example, the means and methods disclosed herein are also applicable to tape systems and the like, as well as to drums etc. Also, the present invention is applicable for providing the positioning required in other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. In a method of recording digital records by impressing data marks along relatively parallel tracks, in either a first or a second skew orientation, these orientations being transverse to one another, the improvement therein of:
   arranging di-gap transducer means adapted to impress and/or detect such data marks along any given track; and
   operating said transducer means to selectively impress such data marks along selected tracks as called-for, while also operating the transducer means to selectively impress "LAMBDA" registration indicia along each given track whereby to facilitate transducer positioning along the track, these indicia taking the form of a "V configuration" or an "inverted V"(or "Λ") configuration and consisting of a pair of orthogonal intersecting registration marks, each such registration mark being aligned along a respective one of the skew orientations;

whereby said data marks and said registration indicia may be impressed and/or detected by common di-gap transducer means; and whereby one may so record along said tracks with little or no concern for inter-track "guard bands"; said registration marks facilitating self-centering along any given track when so used with such a di-gap transducer means.

2. The method of claim 1 wherein said data marks are impressed in a "herringbone" pattern.

3. The method as recited in claim 1, wherein said transducer means is provided in the form of at least one pair of skewed transducer gap means, each gap means adapted to be aligned at a different prescribed skew angle relative to the common track-direction and parallel with a respective "di-bit data marks"; the gaps being aligned transverse to one another and also being coupled to respective first and second output means; and
wherein output-switch means is provided to be coupled between said output means and first and second utilization means so as to interconnect either output means to either utilization means.

4. The method as recited in claim 1, wherein said "LAMBDA" indicia are superposed on said data marks.

5. The method as recited in claim 1, wherein said "LAMBDA" indicia are interspersed between said data marks.

6. In an improved magnetic disk record characterized by relatively circumferential recording tracks comprised of magnetic data marks arrayed in a "herringbone" pattern, all skewed oblique to the track axis with each track comprising one-half the herringbone pattern, the combination therewith of:

at least one "LAMBDA" type set of magnetic di-bit registration marks arranged along each said track whereby said data marks and said registration marks may be impressed and/or detected by common di-gap transducer means and whereby one may so record along said tracks with little or no concern for inter-track "guard bands", said registration marks facilitating self-centering along any given track when so used with such a di-gap transducer means.

7. The record recited in claim 6, wherein said tracks are recorded-upon in "abutting herringbone" fashion; and wherein each said registration di-bit mark constitutes a "Λ" or "V" configuration disposed along the track axis.

8. In a method of providing for the centering of digital read/write di-gap transducer means over a selected one of a number of relatively parallel data tracks of a record medium, these data tracks being comprised of data marks dispersed along the tracks in either a first or a second skew orientation, these orientations being transverse to one another, the di-gap transducer means comprising a pair of R/W gaps aligned transverse to one another and being adapted to impress and/or detect such skewed data marks along any given track, this method comprising:

operating said transducer means to selectively impress such data marks along a selected track as called for;

while also operating the transducer means to selectively impress "LAMBDA" indicia along these tracks interspersed with, or superposed on, said data marks along the single track width whereby to accommodate transducer means positioning relative to the track, these indicia taking the form of a "V configuration" or an "inverted V" configuration and consisting of a pair of orthogonal intersecting registration marks, each such registration mark being aligned along a respective one of the skew orientations;

whereby said data marks and said registration marks may be impressed and/or detected by common di-gap transducer means; and whereby one may so record along the tracks with little or no concern for inter-track "guard bands"; said registration marks facilitating self-centering along any given track when so used with such a di-gap transducer means; and centering the transducer means along a given track with these "LAMBDA" (ΛV) indicia, using said gaps to detect output from the two respective registration marks making-up said "LAMBDA" indicia.

9. An improved method of arranging a read/write system for disk records comprising:

providing first and second read/write utilization means; providing di-gap transducer means in the form of at least one pair of skew transducer-gap means adapted to impress di-bit marks along any track of an associated disk record, each gap means adapted to be aligned at a different prescribed skew angle relative to the common track-direction and parallel with a respective "di-bit", the gap means being aligned transverse to one another and including respective first and second output means and being adapted to impress skew data marks including "LAMBDA" (V, Λ) servo marks; connecting servo control means to said gap means so as to control the positioning of the transducer means responsive to signals derived from said "LAMBDA" servo marks; and coupling output-switch means between said output means and said first and second utilization means and said servo control means whereby to enable selective interconnection of either output means thereto.

* * * * *